United States Patent [19]

Peloza

[11] Patent Number: 4,499,915
[45] Date of Patent: Feb. 19, 1985

[54] FLUID PRESSURE SIGNAL TRANSDUCER
[75] Inventor: Kirk B. Peloza, Wheaton, Ill.
[73] Assignee: Eaton Corporation, Cleveland, Ohio
[21] Appl. No.: 544,164
[22] Filed: Oct. 21, 1983
[51] Int. Cl.³ ............................................. G05D 16/00
[52] U.S. Cl. .................................. 137/85; 137/596.17
[58] Field of Search ............... 137/85, 86, 82, 596.17, 137/487.5; 251/129

[56] References Cited

U.S. PATENT DOCUMENTS

| | | | |
|---|---|---|---|
| 3,860,029 | 1/1975 | Hubler | 137/487.5 |
| 3,878,866 | 4/1975 | Lucien | 137/83 X |
| 4,003,396 | 1/1977 | Fleischman | 137/83 |
| 4,131,130 | 12/1978 | Ruby | 137/596.17 |
| 4,158,386 | 6/1979 | Clark | 137/487.5 |
| 4,362,182 | 12/1982 | Sjolund | 137/85 |

Primary Examiner—Alan Cohan
Attorney, Agent, or Firm—C. H. Grace; R. A. Johnston

[57] ABSTRACT

A transducer for providing a modulated fluid pressure control signal having an electromagnetic stator operable in response to an electrical control signal to apply a magnetomotive torque to a rotary valve member for controlling fluid flow to and from a control signal chamber. A diaphragm senses the difference between the control signal chamber pressure and atmospheric pressure and is operable in response thereto for moving the rotor axially for varying the pole overlap and magnetomotive torque on the rotor.

13 Claims, 6 Drawing Figures

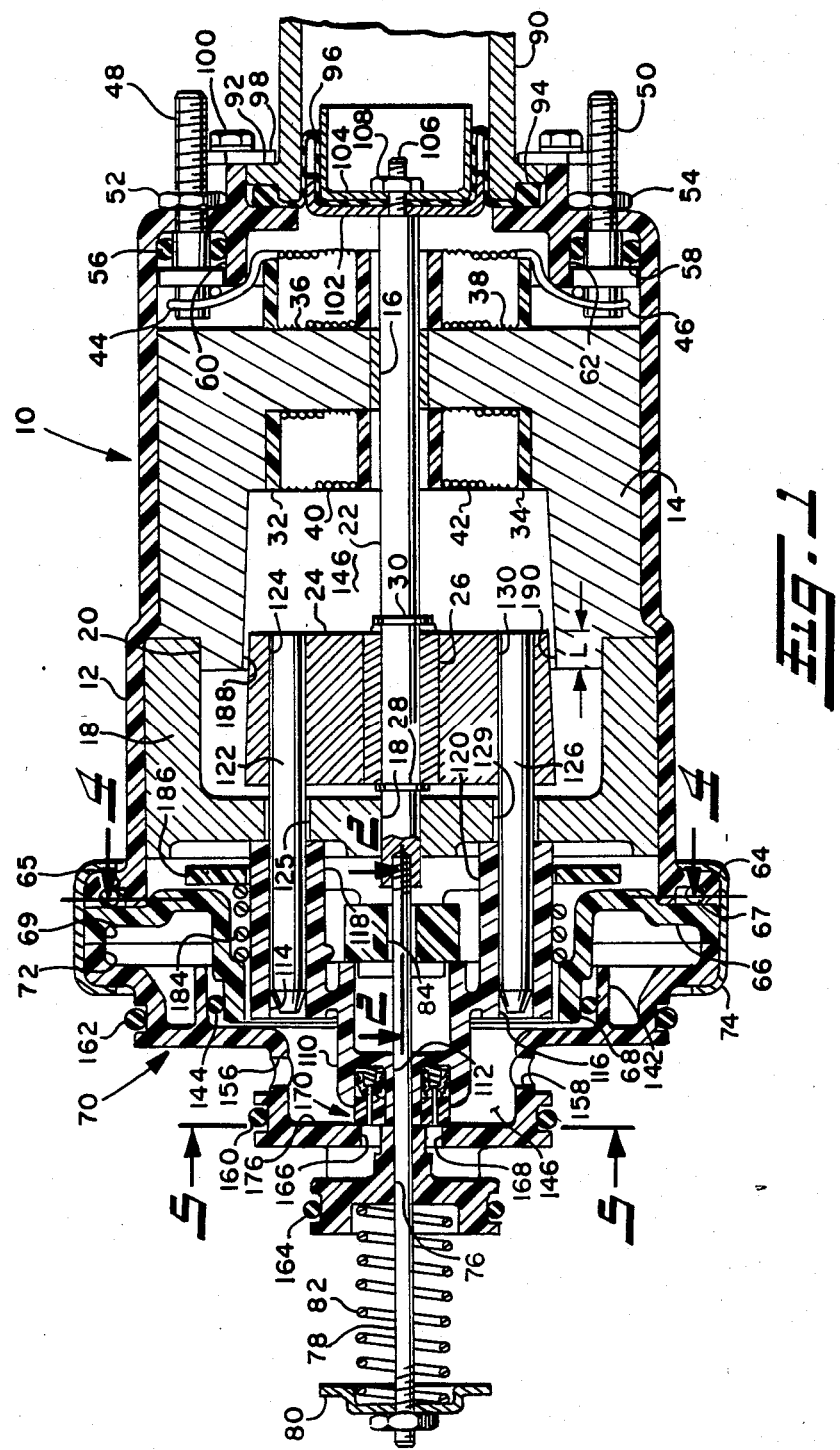

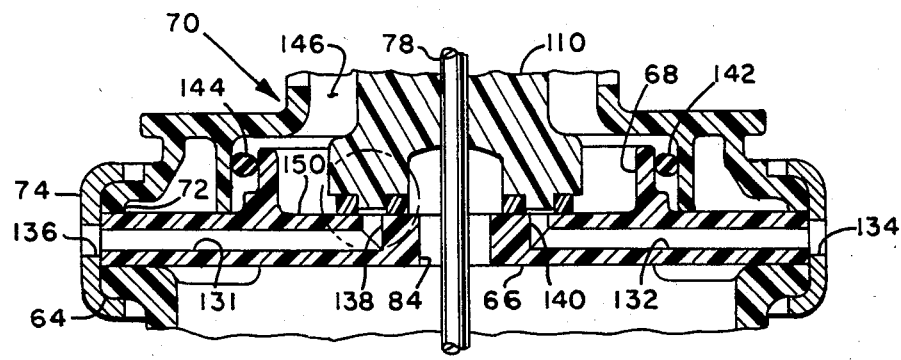

FLUID PRESSURE SIGNAL TRANSDUCER

BACKGROUND OF THE INVENTION

The present invention relates to devices for providing a modulated fluid pressure control signal in response to an electrical control signal input upon connection of the device to a source of pressurized fluid. In particular, the invention relates to devices employed for providing modulation of hydraulic fluid pressure for controlling the shift functions of an automatic transmission for vehicular drive trains.

In designing automotive power plants for meeting present day fuel economy and emission standards, it has been found necessary to integrate the control of engine operating parameters with the shifting of the transmission in order to effect minimum fuel consumption and the lowest level of engine exhaust emissions for given vehicle operating modes. In order to provide such integrated control, it has been found desireable to utilize solid state electronic controllers to process information from various engine sensors to derive an electrical control signal for controlling engine operations. The consequent availability of an intelligent or sophisticated electrical control signal for drive-train control, has thus made it desireable to provide some means or way of electrically controlling the shifting of the transmission, utilizing the output of the electronic engine controller.

One convenient way of controlling the shifting of a vehicle automatic transmission employs the technique of changing or varying the pressure of the hydraulic fluid in the shift control fluid circuit of the transmission.

In designing control devices for varying the fluid pressure in a transmission shift control circuit, it is known to provide a transducer in which a solenoid coil driver is operative to provide, in response to a varying electrical control signal, linear movement of an armature for moving a hydraulic spool valve. The movement of the spool valve controls flow to and from a control signal pressure chamber for providing an output fluid pressure control signal to the transmission shift control circuit. The pressure in the control signal chamber is applied to the end of the spool valve for counteraction against a spring biasing the armature and spool in a given direction.

Additionally, the known spool type valves require precision machining and a close clearance fit about the spool which yields slow response and suscepibility to binding from contaminants.

In the known transducer for providing a fluid pressure output signal responsive to a varying input electrical control signal, the force of the fluid pressure acting against the end of the spool valve requires a substantial counter-balancing force from the armature bias spring in order to maintain the valve spool in a balanced or equilibrium state. The resulting stiffness or relatively high spring rate of the armature bias spring necessitates a substantial magnetomotive force output from the electromagnetic coil. The force requirement has necessitated an electrical input control signal having a power level requirement higher than the capability of the electronic programmer provided for the engine control system.

Thus, it has been desired to find a way or means of providing a fluid pressure control signal transducer capable of operating on a low power input variable electrical control signal. In particular, it has been desired to find a transducer capable of operating on a low power level electrical control signal for providing a modulated fluid pressure signal for the hydraulic circuit in an automotive automatic transmission. This device may also be employed for controlling fluid pressure in hydraulically actuated clutches.

SUMMARY OF THE INVENTION

The present invention provides an electrically operated transducer for controlling a fluid pressure modulator valve operable to provide a fluid pressure control signal responsive to a variable electrical input control signal. The present invention is particularly useful in providing an hydraulic control signal for use in the shift control circuits of an automotive automatic transmission for controlling the transmission shifting in response to an electrical control signal. The present invention provides a transducer which is capable of operating from a low-power electrical control signal of the type which could be produced by a solid state electronic engine controller operable from a vehicle onboard power supply.

The present invention employs an electromagnetic stator having an armature rotatable in response to magnetomotive torque; and, the rotatable armature is maintained in equilibrium force balance by a countering bias spring.

Rotation of the armature of the transducer of the present invention is operative to control inflow and outflow of fluid to a fluid pressure control chamber by moving a rotary valve member.

The stator has a plurality of opposite magnetic poles disposed about the rotor; and, the rotory armature and stator are disposed in axial overlapping relationship so as to define therebetween a radial air gap. The pressure in the fluid pressure control chamber is sensed by a pressure responsive diaphragm. The resultant force acting upon the diaphragm is operative to effect axial movement of the armature for varying the axial overlap of the rotary armature and stator poles. The varying of the axial overlap of the stator poles and armature results in a varying of the magnetomotive torque applied to the rotor; and, thus, provides a force feedback to the valve for controlling movement thereof.

The transducer of the present invention provides a feedback force responsive to the fluid pressure and the signal control chamber, yet the force is operative to vary the magnetic force transmitted between the stator and the armature without applying the mechanical feedback force to oppose the movement of the armature. The transducer arrangement of the present invention thus requires the armature return spring to counter-balance only the magnetomotive force and thereby minimizes the spring rate of the armature bias spring. Utilization of a low-rate bias spring enables the transducer to be responsive to a low power level electrical control signal.

The present invention thus provides an novel transducer for providing a modulated fluid pressure control signal responsive to a variable input electrical signal and provides for sensing the fluid pressure in the control chamber to provide feedback for controlling the position of the fluid pressure modulator valve. The transducer construction of the present invention isolates the fluid pressure sensed for feedback purposes from the movement of the valve member by varying the axial overlap of the stator poles and the armature to vary the electromagnetic torque applied to the rotor. The transducer of the present invention minimizes the bias force on the valve rotor to enable a high degree of sensitivity to low power electrical input signals.

BRIEF DESCRIPTION OF THE DRAWINGS

FIG. 1 is a cross section of the transducer taken through the longitudinal axis of symmetry;

FIG. 2 is an enlarged portion of a section view taken along section-indicating lines 2—2 of FIG. 1;

FIG. 3 is an enlarged view of the encircled portion of FIG. 2;

FIG. 4 is a portion of a section view taken along section-indicating lines 4—4 of FIG. 1;

DETAILED DESCRIPTION

Figure 5:
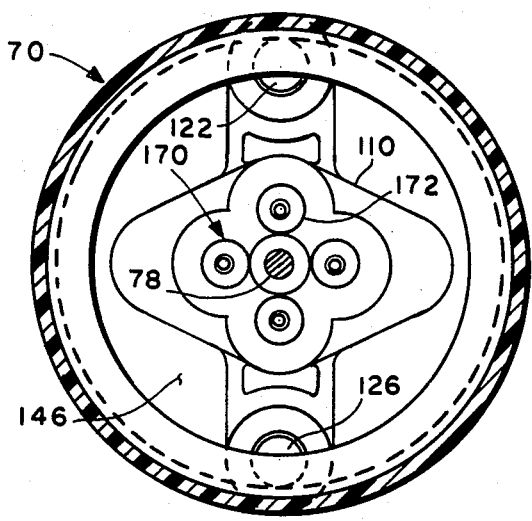
FIG. 5 is a section view taken along section-indicating line 5—5 of FIG. 1; and, FIG. 6 is an enlarged view of a portion of FIG. 1, illustrating the rotary fluid pressure inlet valving mechanism.

Referring to FIG. 1, the transducer indicated generally at 10 has a housing 12 of generally hollow cylindrical configuration with a stator 14, formed of ferromagnetic material, received therein. The stator has a generally rectangular "U"-shaped configuration with a shaft bearing 16 received through the closed end thereof and disposed adjacent the right-hand end of housing 12.

A main bearing member 18 is received in the left-hand end of housing 12 and is registered against a shoulder 20 provided in the stator for maintaining alignment of the bearing member 18.

A shaft member 22 is journaled in bearings 18 and 16 and extends longitudinally therethrough, the shaft 22 being free to slide axially in the bearings.

A rotor 24, formed preferably of ferromagnetic material or material of high magnetic permeability, with diametrically opposite magnetic poles has a bearing 26 provided therein and is received over shaft 22 and journaled for rotation thereon. Rotor 24 is fixed axially on the shaft 22 by means of snap rings 28, 30 received in corresponding grooves provided in the shaft 22. The rotor 24 is axially interdigitated with coil frame 14 by an amount indicated by the letter "L" in FIG. 1 which amount is variable, as will be hereinafter described.

A coil bobbin is provided in two segments 32, 34 received over the legs 36, 38 of the stator frame 14. The bobbins having respectively coils 40, 42 wound thereon in an electrically series connected relationship and coiled in the same direction to produce magnetically additive flux fields. The ends of the coil sections 40, 42 terminate in electrical leads 44, 46.

A pair of electrical terminals 48, 50 are disposed in spaced relationship and extend through the right-hand end of housing 12 through individual apertures provided therefor. The terminals 48, 50 have, respectively, leads 44 and 46 attached to the portion thereof extending interiorly of housing 12. The terminals 48, 50 have the external portions thereof suitably adapted for connection thereto and are retained in the housing by any suitable expedient, as for example, threaded nuts 52, 54. The portions of the terminals 48, 50 extending interiorly of the housing are sealed about the apertures by suitable expedients, as for example, seal rings 56, 58 received over the connector terminals and engaging suitably configured portions of the housing. For this purpose sealing wells 60, 62 are provided in the housing.

The left-hand end of housing 12 in FIG. 1 has an outwardly extending annular peripheral flange 64 provided thereon which has registered there against in fluid pressure sealing relationship, one side of an exhaust plate member 66 which has an outer peripheral flange 69 formed thereabout extending axially leftward in FIG. 1 and an inner annular flange 68 extending axially therefrom in a leftward direction as shown in FIG. 1. Preferably, flange 64 has an annular groove 65 formed therein with a sealing ring 67 received in the groove for sealing against the right-hand face of the exhaust plate outer flange 69.

A nose piece member, indicated generally at 70, has an annular, axially extending, peripheral flange 72 provided thereon which registers against the left-hand face of flange 69 of exhaust plate 66. The nose piece flange 72, the exhaust plate flange 69 and the flange 64 of the housing are retained in fluid pressure sealing assemblage by an annular clamping band 74 received peripherally thereabout.

Nose piece 70 has a generally stepped annular configuration with the left end thereof closed and having a central bore 76 provided therethrough with a rod 78 received therein and extending axially thereof in sliding engagement. Rod 78 extends rightwardly in FIG. 1 through a clearance bore 84 provided in exhaust plate 66. The right-hand end of rod 78 in FIG. 1 is connected to the left-hand end of shaft 22. The left-hand end of rod 78 extends outwardly from the nose piece and has an endcap 80 retained thereon. A spring 82 is received over rod 78 and is maintained in compression with the left-hand end registering against cap 80 and the right-hand end thereof registered against the end of nose piece 70 for biasing the rod 78 in a leftward direction with respect to FIG. 1.

The right-hand end of shaft 22 extends through bearing 16 to the end of housing 12.

A hollow generally cylindrical guide member 90, having an outwardly extending annular flange 92 provided adjacent the axial end thereof, is received over the peripherial bead, or rim, 94 of a flexible elastomeric diaphragm 96 for sealing the rim 94 thereof against the exterior right-hand end face of housing 12. The guide member is retained on the housing by suitable expedients, as for example, a clamping flange 98 and screws 100.

Diaphragm 96 has the central region thereof stiffened by an interior and exterior backing cup 102, 104 respectively, which are retained in sandwiched arrangement over the diaphragm and secured to the right-hand end of shaft 22 by a threaded stud 106 and retaining nut 108. The diaphragm is thus secured for rolling engagement with the inner periphery of guide 90 upon axial movement of the shaft 22. In the embodiment illustrated in FIG. 1, the shaft 22 and diaphragm cups are shown in their extreme leftward limit of axial movement.

With continuing reference to FIG. 1, a carrier member 110 has a central bore 112 therethrough and is received interiorly of the nose piece 70 with rod 78 passing through the bore 112. The carrier 110 has a pair of oppositely disposed axial bores 114, 116 provided through respectively, bosses 118, 120 which are received through slots provided in the exhaust plate as will be hereinafter described. A pin 122 is received through bore 114 in sliding engagement and extends axially through one of the sectoral slots 127 in the exhaust plate 66, (see FIG. 4), through an arcuately shaped clearance slot 125 in bearing 18, and is pressed into a bore 124 provided in the rotor 24. A similar pin 126 is slideably received in carrier bore 116 and extends through sectoral slot 128 (see FIG. 5) in the exhaust plate and through an arcuate clearance slot indicated by reference numeral 129 in FIG. 1, provided in the bearing 18 and is press-fitted into a bore 130 provided in the rotor.

Referring now to FIGS. 1 and 2, the exhaust plate 66 has a pair of oppositely disposed passages 131, 132 extending radially outwardly to communicate with corresponding ports 134, 136 provided in the clamping band 74. Each of the passages 131, 132 has a cross-passage 138, 140 respectively communicating therewith and extending upwardly to the upper face of the exhaust plate 66 in FIG. 2, or to the left-hand face of the plate 66 as illustrated in FIG. 1.

The annular flange 68 of the exhaust plate is radially sealed at the outer periphery thereof against a corresponding annular flange 142 provided on the nose piece 70 by a suitable seal ring 144.

The region interiorly of the nose piece and the exhaust plate flange 68 and housing 12 forms a fluid pressure control chamber denoted 146. With reference to FIGS. 2 and 3, the passages 131, 132 communicate with chamber 146 via passages 138, 140 through the clearance beneath the carrier member 110, depending upon the rotational position of the carrier 110 with respect to the exhaust plate 66.

Referring to FIG. 3, a valving mechanism indicated generally at 147 is shown typically for valving passage 138. It being understood that a corresponding valve (not shown) is provided and operates to control flow through passage 140.

The carrier 110 has a depending boss 148 extending downwardly therefrom in FIG. 2 (rightwardly therefrom in FIG. 1), which boss 148 extends to a position spaced adjacent the upper surface 150 of the plate 66. A valve sealing collar 152 is received over the boss 148 in sliding engagement therewith and is biased in a downward direction in 53 (rightward direction in FIG. 1) by spring 154 for sliding contact with the upper face 150 of the exhaust plate 66.

When the carrier 110 is rotated to a position in which the lower face of the collar 152 completely encircles the passage 138, a seal is effected around the passage 138 and communication between chamber 146 and passage 138 is blocked. When the carrier 110 is rotated such that the collar 152 does not completely encircle passage 138, fluid communication is permitted between chamber 146 and exhaust passage 138, 131. It will be understood that a similar valving action is provided for passage 140 by a second valve (not shown).

Referring now to FIG. 1, the nose piece 70 has at least one, and preferably two, oppositely spaced fluid pressure signal ports 156, 158 extending radially outwardly through the cylindrical wall thereof. A seal ring 160 is received in a peripheral groove thereabout and adapted for sealing in a bore to communicate with signal passages 156, 158.

A second seal ring 162 is provided about the cylindrical periphery of the nose piece 70 in a region adjacent the clamp 74. Ring 162 is adapted for sealing in a larger diameter portion of a bore for providing a sealed chamber about the ports 156, 158 between rings 160, 162.

Referring to FIG. 1, the left-hand end of the nose piece 70 has a third seal ring 164 received in a peripheral groove thereabout axially spaced from ring 160 and adapted for sealing in a reduced diameter portion of a bore for providing a sealed chamber between the axially spaced seal rings 160, 164.

A plurality, and preferably four fluid inlet passages are provided axially through the wall of nose piece 70 to the interior thereof, two of which passages 166, 168 are illustrated in FIG. 1. The passages are circumferentially equally spaced about the nose piece in the region radially adjacent the rod bore 76. A rotary valving mechanism, indicated generally at 170, is provided on the left-hand end of carrier 110 for controlling fluid flow from the inlet passages 166, 168 to the signal pressure control chamber 146.

Figure 6:
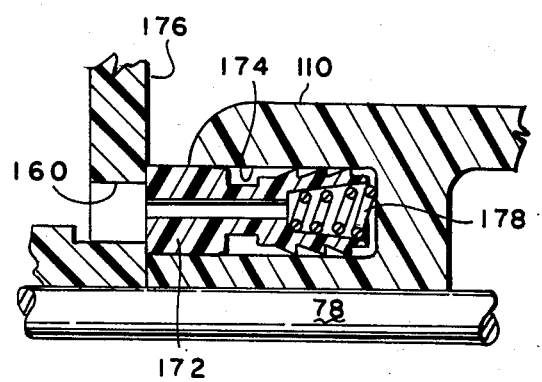

Referring now to FIG. 6, one of the rotary inlet valves 170 is indicated in greater detail as formed typically in four places, only one of which is shown in FIG. 6, by a face valve member 172 slideably received in a bore 174 provided in the right-hand end face of the carrier 110. The plurality of valves shown typically at 170 are disposed about the end of the carrier in circumferentially equally spaced arrangement as may be seen with reference to FIG. 5.

The valve member 172 as shown in FIG. 6, is biased against the interior surface of the wall of nose piece 70 by a suitable spring as for example, the tapered spring 178 shown in FIG. 6 with one end registered against the bottom of bore 174 and the other end contacting a recess in valve member 172. It will be understood that the diameter of valve member 172 is slightly greater than that of the inlet port 166; and, such is true of each valve member provided for the inlet ports in the nose piece.

In the presently preferred practice, in the typical valving arrangement 170, when the carrier 110 is rotated such that each of the valve members, such as 172, is aligned over the corresponding inlet port such as 166, fluid communication between the inlet port and the signal pressure control chamber 146 is blocked completely, or partially blocked, depending upon the amount of overlap of the valve member with the inlet port. When the valve members, such as 172, are rotationally spaced from the inlet port such as 166, full fluid communication is provided to the fluid pressure control chamber 146.

Referring now to FIGS. 3 and 4, the arrangement of the exhaust valve 147 is shown wherein the passages 138, 140 are disposed with respect to the bosses 118, 120 on the carrier 110 such that when the carrier 110 is rotated to the position shown in solid outline in FIG. 4, the exhaust ports 138, 140 are fully open to permit communication of exhaust passages 131, 132 with fluid signal pressure passage 146.

When the carrier 110 is rotated counter clockwise in FIG. 4 to the position shown in dashed outline, the valving mechanism 147 will be in the position as shown in FIG. 3 to block communication between the passages 138, 140 with the signal control chamber 146.

FIG. 4 illustrates the arrangement whereby the pin bosses 118, 120 pass through sectoral slots 127, 128 provided in the exhaust plate 66 which slots also serve as rotational stops for the carrier 110.

Referring to FIG. 1, a torsion spring 184 is received over the bosses 118, 120 of the carrier 110. One end of the torsion spring 184 is anchored about boss 118 and the remaining end of the spring is anchored to a rotationally adjustable calibration ring 186 received over the carrier bosses axially intermediate the exhaust plate and the bearing 18. When the ring has been rotated to a position to give the desired preload torque to the rotor, the ring is secured to the stationary exhaust plate by suitable expedience as for example, locking screws (not shown).

The spring biases the carrier and rotor to an initial position in which the inlet valving mechanism 170 is fully open in the illustrated embodiment of the invention. In the embodiment illustrated, the exhaust valving mechansim 147 is fully closed when the inlet valving 170 is fully open.

The arrangement of the torsion spring and calibration ring 186 of the embodiment of FIG. 1 thus enables the nose piece, carrier and exhaust plate to be preassembled and calibrated for the desired rotational preload on the carrier as a subassembly. The calibrated subassembly may then be assembled over the pins 122, 126 extending from the rotors 24 through the bearing 18, with the pins slideably engaging the carrier bores 114, 116. The subassembly is retained on the housing 12 by installation of clamping band 74 and flange sealing ring 67.

In operation, as a current flows in coil sections 40, 42 the magnetic flux generated thereby in stator frame 14 is concentrated at the magnetically opposite poles 188, 190 which apply a magnetomotive torque across the radial airgap to the corresponding poles of the rotor. When sufficient current flows in the coil sections 40, 42, the torque applied to the rotor overcomes the bias of torsion spring 184, and the rotor and carrier 110 begin to turn to cause the inlet port valving mechanism 170 to begin to close and the exhaust valving mechanism 147 to begin to open.

As the current flow in coil sections 40, 42 increases further, the torque on rotor 24 causes further rotation of carrier 110 and further closing of the inlet valving mechanism 170 to further decrease flow to the chamber 146; and, the exhaust valving mechanism 147 opens further to permit greater return flow to the fluid supply sump. At full signal current flow through coil sections 40, 42 the maximum torque is applied to rotor 24 for full limit rotation thereof. At the full limit of rotor rotation as determined by bosses 118, 120 contacting the sides of sector slots 127, 128 in the exhaust plate, inlet valving mechanism 170 is closed to prevent fluid flow to the pressure chamber 146 and exhaust valving mechanism 147 is fully open to permit signal pressure chamber 46 to bleed off to the sump.

In the present practice of the invention, for a control signal current of 0–1 ampere and a 30° central arc of rotation of carrier 110 for valving, it has been found satisfactory to employ a torsion spring 184 having a rate of $1.7 \times 10^{-3}$ in.-lbs./degree or $3. \times 10^{-5}$ newton-meters/radian.

It will be understood, however, that the foregoing arrangement of the inlet valving mechanism 170 and the arrangement of the exhaust valving mechanism 147 may be chosen otherwise in accordance with the desired fluid pressure modulating characteristics of the valve for a given electrical signal current. For example, operation of the exhaust valving mechanism 147 and the inlet valving mechanism 170 may be reversed if required for reversed signal pressure output characteristics with respect to increasing input electrical control signal characteristics. It will be understood further, that for flow-through signal pressure type system applications, the exhaust valving mechanism may be eliminated and the pressure in the signal control chamber from inlet flow controlled only by inlet valving mechanism 170, with the exhaust occuring through signal ports 156, 158 to the controlled system.

The spring 82 initially biases rod 78 and shaft 22 to the full leftward position to maintain rotor 24 in the position of minimum axially overlap of stator poles and rotor shown in FIG. 1 for minimumizing the torque applied to the rotor for a given coil current.

In the event that a sudden pressure surge in the inlet causes a rapid change in the pressure in signal chamber 146, the signal chamber pressure is applied to diaphragm 96 causing the diaphragm to move the shaft 22 rightwardly in FIG. 1 in a direction to increase the axial overlap of the rotor with respect to stator poles 188, 190.

It will be understood that increasing the axial overlap of the rotor with respect to stator poles 188, 190 increases the magnetomotive torque on the rotor for a given current. This increased torque causes the rotor to rotate to a position tending to further close the inlet and open the exhaust to thereby reduce the pressure in control signal chamber 46.

In the present practice of the invention, a value of the axial pole overlap "L" in the range 0.25–0.50 inches (6.3–12.6 mm) has been found satisfactory for control signal chamber pressures in the range 0–70 PSIG (0–4.8 atmosphere gauge). With such values of overlap "L" and control signal pressure, it has been found satisfactory to employ a spring 82 having a rate of 70 lb./in. (12,260 newtons/meter).

Thus, the transducer arrangement of the present invention provides a mechanical feedback to the rotor to vary the axial position of the rotor in response to the pressure in the control signal pressure chamber 146. The transducer of the present invention thus utilizes the force produced by such pressure variations to change the rotor position axially and magnetically and in turn increases the magnetic torque on the rotor to move the valve to a position to decrease the pressure.

It will be noted that the stator poles 188, 190 and the outer periphery of the rotor are axially tapered to provide an additional degree of variation in the radial airgap upon axial movement of the rotor with respect to the stator poles. This feature permits an additional degree of variation in the feedback response to the variations in pressure in the control signal chamber.

The present invention thus provides a unique pressure transducer which provides a fluid pressure modulator valve responsive to an electrical input signal for movement of a rotary modulator valving mechanism to control the pressure to a fluid signal chamber. Variations in the pressure in the fluid signal chamber are sensed by a pressure responsive means operative to cause axial movement of the magnetic rotor with respect to the stator poles for providing feedback variation of the magnetic torque on the rotor for counteracting the pressure variations in the control signal pressure chamber.

Although the invention has been hereinabove described with respect to the illustrated embodiments, it will be understood that variations and modifications may be made in the invention which is limited only by the following claims.

What is claimed is:

1. An electrically controlled fluid pressure modulator valve comprising:
   (a) housing means defining a fluid pressure signal chamber having an inlet port for connection to a source of fluid pressure, an exhaust port and a signal output port;
   (b) pressure responsive means operably sensing the pressure differential between said signal chamber and the atmosphere external to said housing means;

(c) valve means, operable upon movement to control fluid communication between said inlet port and said chamber and between said chamber and said exhaust port;

(d) magnetomotive force means including electromagnetic means defining opposite magnetic poles received on said housing means and adapted for connection to receive an electrical control signal;

(e) rotor means formed of ferromagnetic material received said housing means and defining an axial overlap and radial air gap with said poles, said rotor means rotatable with respect to said poles for effecting rotation of said valve means upon experiencing a torque applied by said magnetomotive force means, said rotor means being disposed for axial movement for varying said axial pole overlap; and, (f) means connecting said pressure responsive means and said rotor means and operable to effect changes in said axial overlap in response to changes in said pressure differential.

2. The device defined in claim 1, wherein said valve means comprises a pair of spaced ports and a rotary valve member operative for effecting communication between said ports and said signal chamber.

3. The device defined in claim 1, wherein said connecting means comprises a shaft for said rotor means.

4. The device defined in claim 1, wherein said connecting means comprises a member passing through said signal chamber.

5. The device defined in claim 1, further comprising means operable to apply a resistive torque to said rotor means for limiting rotational movement thereof by said magnetomotive force means.

6. The device defined in claim 1, wherein rotation of said rotor means is resisted by bias spring means.

7. The modulator valve defined in claim 1, wherein, said rotor means and said poles define radially spaced axially tapered surfaces.

8. The device defined in claim 1, wherein said electromagnetic means includes a generally rectangular "U" shaped pole frame defining said poles and an electrical coil disposed about said frame.

9. An electrically controlled fluid pressure modulator valve comprising:
(a) body means defining a fluid pressure signal chamber having an inlet passage, an exhaust passage and a signal output passage communicating therewith said inlet passage adapted for connection to a source of fluid pressure;
(b) valve means, including a member operable upon rotary movement to control fluid flow through said inlet passage to said chamber;
(c) electromagnetic means received on said housing means and defining spaced opposite magnetic poles, said electromagnetic means adapted for connection to a source of electrical control signal current;
(d) rotor means received on said body means for rotation with respect thereto including a member formed of ferromagnetic material disposed between said poles and defining an axial overlap and radial air gap with said poles, said rotor means experiencing a magnetomotive torque upon flow of electrical current to said electromagnetic means, said rotor means operatively responsive to such torque for effecting rotation of said valve means;
(e) pressure responsive means operably sensing the pressure in said signal chamber;
(f) means connecting said pressure responsive means and said rotor means and operable to effect changes in said axial pole overlap in response to changes in said pressure differential, and;
(g) bias means resisting rotational movement of said rotor means.

10. The device defined in claim 9, wherein said valve means member has a passageway therethrough rotatable with said rotor means.

11. The device defined in claim 9, wherein said connecting means comprises a member passing through said signal chamber.

12. The device defined in claim 9, wherein bias means includes torsional spring means operable to apply a resistive torque to said rotor means for limiting rotational movement thereof by said electromagnetic force means.

13. An electrically controlled fluid pressure signal transducer comprising:
(a) body means defining a fluid pressure signal chamber having an inlet passage adapted for connection to a source of fluid pressure and a fluid pressure signal outlet passage adapted for connection to a device responsive to a fluid pressure signal;
(b) rotary valve means including a member operable upon rotational movement to control fluid flow between said inlet passage and said outlet passage;
(c) electromagnetic means received on said housing means and defining spaced opposite magnetic poles, said electromagnetic means adapted for connection to a source of electrical control current;
(d) rotor means received on said body means for rotation with respect thereto including a member formed of material having a high magnetic permeability disposed between said magnetic poles and defining an axial overlap and radial airgap with said poles, said rotor means experiencing a magnetomotive torque upon flow of said electrical control current to said electromagnetic means, said rotor means operative in response to such torque to effect rotation of said valve means;
(e) pressure responsive means operably sensing the pressure in said signal chamber;
(f) means connecting said pressure responsive means and said rotor means and operable to effect variation in said axial pole overlap in response to changes in the pressure in said chamber; and,
(g) bias means resisting rotational movement of said rotor means for controlling the position of said valve means in response to said magnetomotive torque on said rotor means.

* * * * *